July 21, 1970  J. DOLLET  3,521,477
HIGH-SENSITIVITY CREEP DETECTOR
Filed June 6, 1967  2 Sheets-Sheet 1
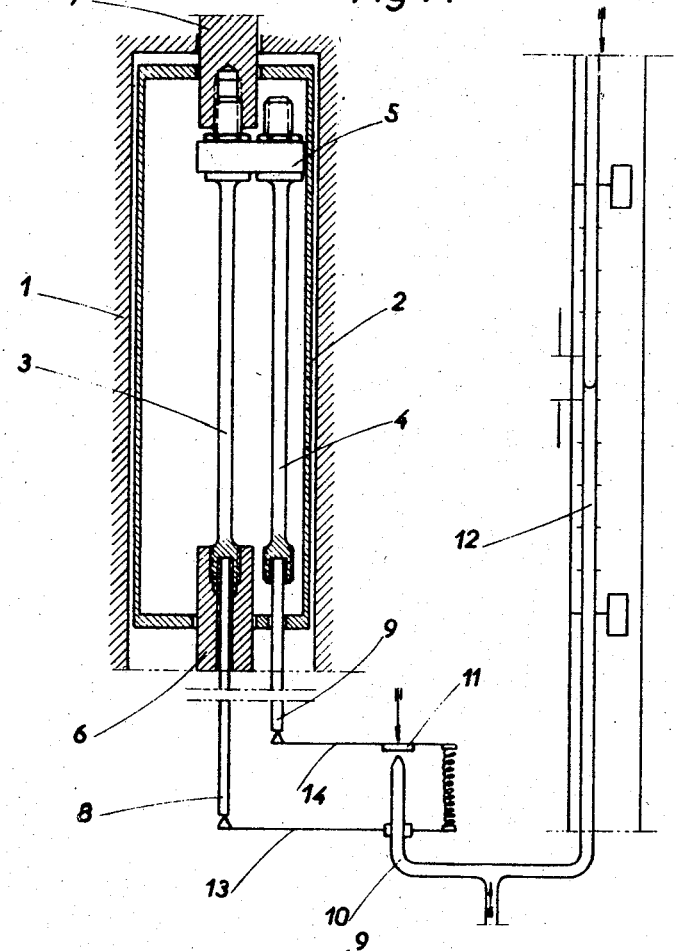
Fig. 1
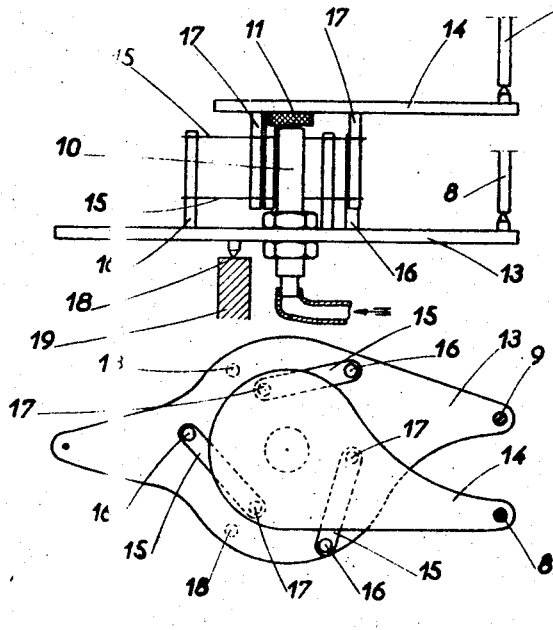
Fig. 2
Fig. 3

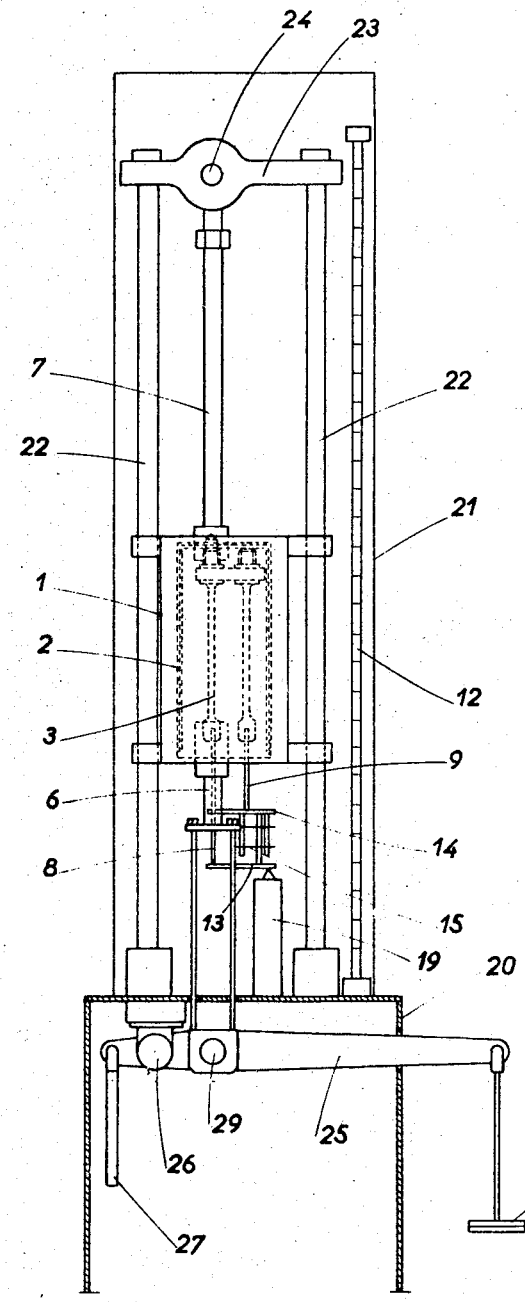
Fig: 4

United States Patent Office 3,521,477
Patented July 21, 1970

3,521,477
HIGH-SENSITIVITY CREEP DETECTOR
Jean Dollet, Le Creusot, France, assignor to Société des Forges et Ateliers du Creusot, Paris, France, a company of France
Filed June 6, 1967, Ser. No. 643,954
Claims priority, application France, June 10, 1966, 65,085
Int. Cl. G01n 3/18
U.S. Cl. 73—15.6                              2 Claims

ABSTRACT OF THE DISCLOSURE

A high-sensitivity creep detector for measuring specimens to discover small creep deformations of materials, more particularly metals, comprising a heating oven comprising an isothermal chamber in which a test specimen experiences a static elongating load and an unloaded control specimen of the same dimensions as the test specimen are disposed, differential variations in the length of the two specimens being transmitted, via sensing elements connected to the two specimens, to a micrometer system.

---

This invention relates to a high-sensitivity creep detector for measuring specimens to discover small creep deformations of materials, more partciularly metals.

In measuring small creep distortions—i.e., distortions of the order of 0.01% occurring after a period as long as $10^5$ hours, variations in specimen length due to even very small variations of the temperature at which the specimens are heated may be many times more than length variations which are caused by creep and which it is required to measure. Unfortunately, the temperature stability of present-day laboratory ovens is not enough to ensure satisfactorily correct length measurement results. One way of offsetting temperature variations of an oven would be to measure the distortion and temperature of the specimens simultaneously and then correct the distortion curve, but the apparatus required would have to be large for the reading accuracy of temperature to be retained throughout the tests—i.e., e.g. for about 1,000 hours.

It is an object of this invention to obviate the effect of temperature variations in a laboratory oven having normal temperature stability on distortion measurements.

According to the invention, the detector comprises a heating oven comprising a temperature-uniformising chamber in which a test specimen experiences a static elongating load and an unloaded control specimen of the same dimensions as the test specimens are disposed, differential variations in the length of the two specimens being transmitted, via sensing elements connected to the two specimens, to a micrometer system disposed outside the oven.

An embodiment of a creep detector according to the invention will be described hereinafter and is shown substantially diagrammatically and by way of example in the accompanying drawings wherein:

FIG. 1 is an overall view of the oven showing the arrangement of the specimens and showing the elements for transferring distortions to outside the oven;

FIGS. 2 and 3 are views, in elevation and section respectively, of the arrangement of the strain gauge for measuring the differential distortions of the two specimens, and FIG. 4 is an overall view of the detector.

The electric oven 1 shown in FIG. 1 comprises inside the heating body a sleeve 2 enclosing a test specimen 3 and a control specimen 4. Sleeve 2, which is made of a thermally conductive material such as copper, bounds the heating atmosphere and also forms an isothermal wall. The specimens 3, 4 are secured at their top ends to a common plate 5. Only the specimen 3 is loaded; accordingly, specimen 3 has both its ends screwed into two vertical rods 6, 7 of some known form of loading facility, for example, of the kind which is shown in FIG. 4 and which will be described hereinafter.

Associated with the bottom ends of the specimens 3, 4 are two quartz sensing fingers 8, 9 which transmit movements caused by differential elongations of the two specimens to outside the oven. Such elongations are measured by a pneumatic micrometer. The micrometer shown, which is of known kind, comprises a compressed air nozzle 10 which co-operates with a plate 11; the pressure upstream of the nozzle, such pressure being dependent upon the distance between the nozzle and the plate, provides an indication of the measurement, the reading being in microns on a graduated scale 12 and, if required, on a recording facility (not shown).

Nozzle 10 is mounted on a lever 13 on which the sensor 8 acts, and plate 11 is mounted on a lever 14 on which the sensor 9 acts. The two levers 13, 14 are interconnected by a resilient connection which is shown in greater detail in FIGS. 2 and 3 and which comprises three pairs of two resilient strips 15 disposed in the same vertical plane, the three plane pairs forming an angle of 120° with one another. Each of the pairs of strips 15 is secured to a spindle 16 rigidly secured to the lever 13 and to a spindle 17 rigidly secured to the lever 14. By way of two articulation points 18, lever 13 bears on a stationary element 19. The deformable parallelogram formed by the two groups of strips 15 ensures that the nozzle 10 is always vertical in relation to the plate 11 throughout the range of measurement.

The complete detector is shown diagrammatically in FIG. 4. A stationary baseplate 20 bears a transparent enclosure 21 in which are disposed vertical columns 22 for guiding the oven 1 into vertically adjustable positions. The columns 22 bear a cross-member 23 to which the facility for loading the test specimen 3 is connected at a place 24. This loading facility, which is of known kind, comprises a balance beam 25 which is pivoted to the baseplate 20 at a place 26 and on which a balance weight 27 and an adjustable weight 28 forming the test load are hung. Balance beam 25 is connected by way of an articulation 29 to rod 6 which transmits the load to test specimens 3, which is suspended by way of rod 7 at articulation 24.

Enclosure 21 also contains sensitive equipment such as a micrometer for measuring specimen distortion and the reading and recording rig.

A temperature above ambient temperature and controllable by the controlled intake of fresh air from outside is produced in enclosure 21. A control of this kind can be provided quite readily since variations of the order of ±0.3° C. relatively to the required mean temperature have little effect on measurement accuracy. Oven temperature can be controlled accurately enough by known means, since effective compensation for temperature effects is provided in that both the specimens are always at the same temperature.

The heating current is normally taken from the mains, but to cover mains failures, which would falsify measurements even in the case of very short interruptions, a stand-by power supply is provided, such as a battery of accumulators cut in by a safety relay system controlled by the mains current.

Of course the detector hereinbefore described can be varied or supplemented by any useful ancillary element without departure from the scope of the invention.

I claim:
1. A high-sensitivity creep detector for measuring spec- imens to discover small creep deformations of materials, more particularly metals, comprising a heating oven, an isothermal chamber in said oven, a test specimen receiving a static elongating load and an unloaded control specimen of the same dimensions as the test specimen in said oven, sensing elements including a first lever and a second lever, each of said levers being connected to one of the two specimens and connected to a micrometer system, said micrometer system being disposed in an isothermal enclosure whose temperature is constant and near the ambient temperature whereby differential variations in the length of the two specimens are measured, said micrometer system comprising a pneumatic strain gauge including an air nozzle mounted on said first lever, a fixed pivot for said first lever, a plate for said gauge mounted on said second lever opposite said nozzle, means for maintaining said nozzle in vertical relation to said plate comprising three pairs of spaced resilient strips, each pair of said strips being in the same vertical plane, said planes being disposed at 120° to the adjacent ones of said planes, a spindle for each of said pairs of strips secured to said first lever and a second spindle for each of said pairs of strips secured to said second lever and pressure responsive means for showing the relative movement of said plate and of said nozzle.

2. A detector as set forth in claim 1, the sensing elements being quartz rods coaxial with the specimens.

References Cited

UNITED STATES PATENTS 2,290,868  7/1942  Eriksson _____ 73—15.6
2,455,285  11/1948  Versaw _____ 33—147

FOREIGN PATENTS 1,456,626  10/1966  France.

JAMES J. GILL, Primary Examiner
H. GOLDSTEIN, Assistant Examiner

U.S. Cl. X.R.
33—147